United States Patent [19]

Heithoff

[11] Patent Number: 4,521,238

[45] Date of Patent: Jun. 4, 1985

[54] METHOD AND APPARATUS FOR CONTROLLING AN ABLATION LIQUEFACTION PROCESS

[75] Inventor: Robert B. Heithoff, LaVale, Md.

[73] Assignee: PPG Industries, Inc., Pittsburgh, Pa.

[21] Appl. No.: 555,256

[22] Filed: Nov. 25, 1983

[51] Int. Cl.³ .................................................. C03B 5/14
[52] U.S. Cl. ........................................ 65/135; 65/27; 65/134; 65/337; 266/213; 432/264
[58] Field of Search ................. 65/135, 134, 337, 335, 65/27; 266/213, 900; 432/264

[56] References Cited

U.S. PATENT DOCUMENTS

| | | | |
|---|---|---|---|
| 2,006,947 | 7/1935 | Ferguson | 65/335 X |
| 2,834,157 | 5/1958 | Bowes | 65/335 X |
| 4,381,934 | 5/1983 | Kunkle et al. | |

Primary Examiner—Robert Lindsay
Attorney, Agent, or Firm—Dennis G. Millman

[57] ABSTRACT

Process control method and apparatus for an ablation liquefaction chamber including primary and secondary burners positioned to direct a primary combustion flame for electively heating portions of the chamber interior for control of product temperature and chamber pressure.

24 Claims, 3 Drawing Figures

FIGURE I

METHOD AND APPARATUS FOR CONTROLLING AN ABLATION LIQUEFACTION PROCESS

BACKGROUND OF THE INVENTION

The present invention relates to controlling conditions within a chamber for converting pulverulent raw materials to a liquefied state as a first step in a melting process. The invention is generally applicable to processes that involve thermally converting a generally flowable, essentially solid state feed material to a molten fluid. The invention is particularly applicable to melting a transient layer of the material supported by a stable layer of granular, thermally insulating, non-contaminating material, e.g., liquefying a layer of glass batch supported by a layer of material such as a granular batch constituent or glass batch.

U.S. Pat. No. 4,381,934 to Kunkle et al. teaches a method of converting particulate batch materials to a partially melted, liquefied state on a support surface of batch material within a melting chamber. As taught therein, the initial process of liquefying batch material is isolated from the remainder of the melting process and is carried out in a manner uniquely suited to the needs of the particular step, thereby permitting the liquefaction step to be carried out with considerable economies in energy consumption and equipment size and cost. In addition, because thermal energy input is used to perform only the particular liquefaction step, the relationship between this input and other operating parameters is more direct and generally less complex than in a conventional tank-type melting furnace.

In a preferred embodiment of the Kunkle invention, a drum portion of the melting chamber is mounted for rotation so that batch fed into the chamber is held against chamber side walls by rotation of the drum to maintain a stable layer along the interior of the drum. Thermal energy is supplied to the drum interior so that the batch layer encircles the heat source. The liquefaction process is carried out by feeding batch into the drum through a stationary lid while rotating the drum and supplying heat to the drum interior to melt incoming batch material in a transient layer while an underlying layer of batch remains substantially stable and unmelted. As the material is liquefied, it flows downward toward an exit end of the rotating drum.

Central to the Kunkle method is the concept of employing a non-contaminating, thermally insulating layer of granular material (e.g., glass batch itself) as the support surface upon which liquefaction of glass batch takes place. A steady state condition may be maintained in the liquefaction chamber by distributing fresh batch onto a previously deposited batch surface at essentially the same rate at which the batch is melting, whereby a substantially stable batch layer will be maintained beneath a transient batch layer, and liquefaction is essentially confined to the transient layer. The partially melted batch of the transient layer runs off the surface while contacting substantially only a batch surface, thus avoiding contaminating contact with refractories. Because glass batch is a good heat insulator, providing the stable batch layer with sufficient thickness protects any underlying support structure from thermal deterioration.

In addition, it would be advantageous to provide means for adjusting operating parameters such as energy input in response to changing conditions within the melter for effective control of the batch layer thickness as well as other liquefaction process parameters.

SUMMARY OF THE INVENTION

The present invention relates to a method of and apparatus for controlling conditions within a melting chamber of the type which utilizes a stable layer of granular, thermally insulating material, e.g., glass batch material, for supporting a transient layer of melting batch material during liquefaction of the material. Although not limited thereto, the invention is advantageously practiced for controlling an ablation liquefaction process in which the stable batch layer encircles a radiant heat source.

The invention relates to a method of and apparatus for providing radiant energy to the chamber interior such that the radiant energy impinges upon the transient batch layer in a substantially uniform manner to substantially confine the melting process to melting the transient layer to maintain the stable batch layer within the desired thickness range throughout the melter interior. In addition, the invention includes facilities for selectively heating portions of the chamber interior for process control of product temperature and/or localized pressure gradients within the chamber.

THE DRAWINGS

DETAILED DESCRIPTION OF THE INVENTION

The preferred embodiment of the present invention relates to an ablation liquefaction process such as that taught in U.S. Pat. No. 4,381,934 to Kunkle et al., the teachings of which are hereby incorporated by reference.

For purposes of illustration the invention will be described as practiced with a rotary melter for liquefying glass batch material similar to that disclosed in U.S. patent application Ser. No. 481,970, filed Apr. 4, 1983, abandoned to Kunkle et al., the teachings of which are hereby incorporated by reference. Other processes in which the invention is applicable may include metallurgical smelting-type operations and fusing of single or multiple component ceramics, metals or other materials. However, for the purposes of illustration, the present invention will be described as related to methods for melting glass, e.g., flat glass, container glass, fiber glass or sodium silicate glass, and in particular, to the first stage of melting, i.e., rendering batch materials to a liquefied state.

Figure 1:
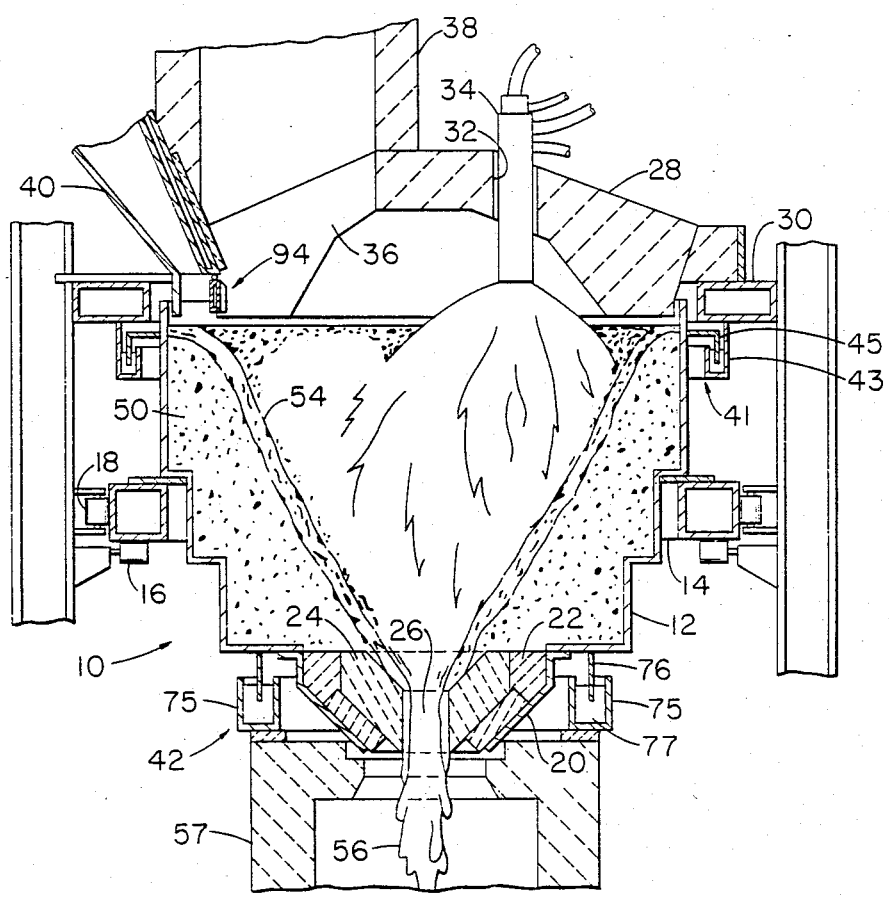
FIG. 1 is a cross-sectional view of a preferred embodiment of melting vessel in which the present invention may be incorporated.
Figure 2:
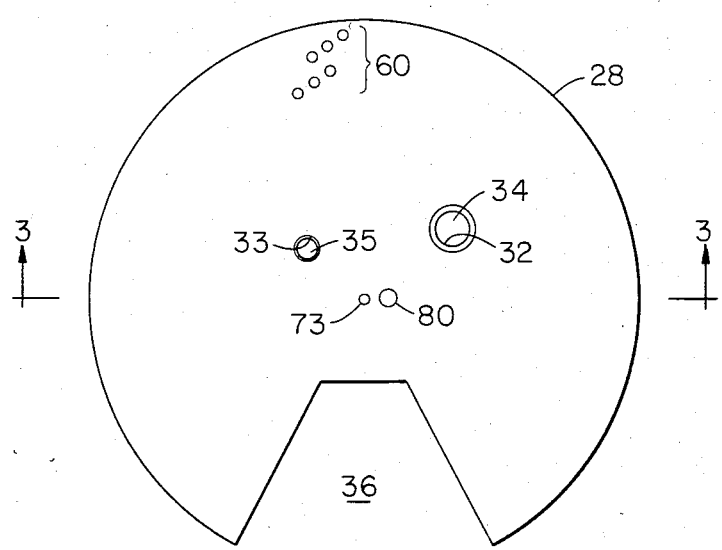
FIG. 2 is a plan view of the lid of the melting vessel of FIG. 1, showing a typical arrangement of burner locations in accordance with the present invention.
Figure 3:
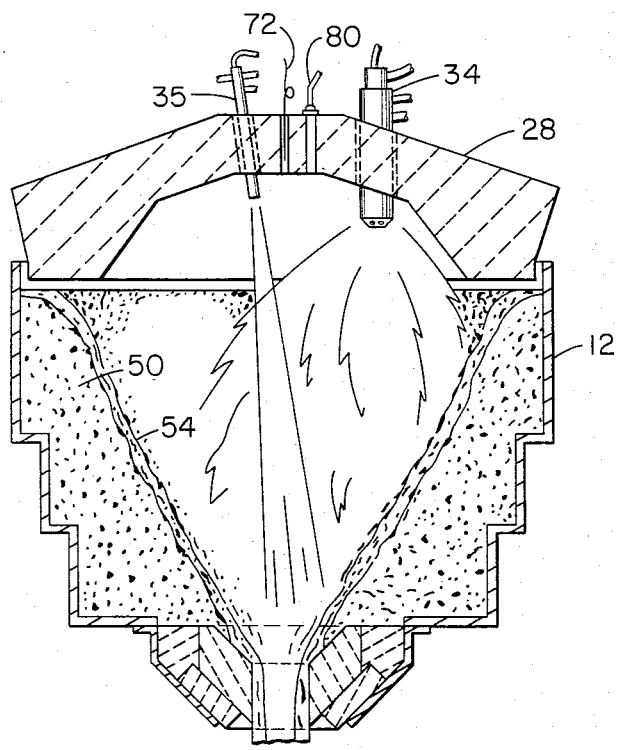
FIG. 3 is a cross-sectional view of the drum portion of the preferred melting vessel taken along line 3—3 in FIG. 2, showing a preferred burner arrangement in accordance with the present invention.

With reference to FIG. 1, the melter 10 may include a steel drum 12 having stepped sidewalls so as to decrease the amount of mass being rotated. The drum 12 is supported on a circular frame 14 which is, in turn, mounted for rotation about a generally vertical axis, corresponding to the centerline or axis of symmetry of the drum, on a plurality of support rollers 16 and aligning rollers 18. A bottom section 20 may be detachably secured to the drum 12. The bottom section 20 may be lined with an annulus of refractory material 22 such as castable refractory cement in which is seated a ring-like bushing 24 of an erosion resistant refractory material. The bushing 24 may be comprised of a plurality of cut pieces of ceramic. An open center 26 in the bushing 24 comprises the outlet opening from the liquefaction chamber. An upwardly domed refractory lid 28 is provided with stationary support by way of a surrounding frame member 30. The lid includes openings 32 and 33 for inserting primary burner 34 and auxiliary burner 35 (FIGS. 2 and 3). The exhaust gases escape upwardly through an opening 36 through the lid 28 and into an exhaust duct 38. The opening 36 may also be utilized for feeding the raw materials to the liquefaction chamber, and, as shown in FIG. 1, a feed chute 40 is provided for this purpose. A pivotable batch deflector 44 may be provided at the end of chute 40.

To isolate the interior of the liquefaction chamber from the exterior ambient conditions and to trap any dust or vapors that may escape from the vessel, upper and lower water seals 41 and 42 respectively are provided. The upper seal comprises a trough 43 affixed to the frame 30 and a flange 45 attached to the drum 12 and having a downwardly extending portion immersed in a liquid (e.g., water) contained in the trough 43. The lower seal similarly includes a trough 75 and flange 76 immersed in liquid 77.

As shown, a stable layer of batch material 50 lines the interior of the drum 12. Before the melter 10 is heated, the stable layer of batch material 50 is provided in the melter by feeding loose batch through the feed chute 40 while the housing is rotated. The loose batch assumes a generally parabolic contour as shown in FIG. 1. The batch material may be wetted, e.g., with water, during the initial stage of forming the stable layer to facilitate cohesion of the layer along the sidewalls.

During the melting process, continuous feeding of batch to the melter 10 results in a falling stream of batch that becomes distributed over the surface of the stable batch layer 50, and by the action of the heat, e.g., from the primary burner 34 and the auxiliary burner 35, becomes liquefied in a transient layer 54 that runs to the bottom of the vessel and passes through the open center 26. The liquefied batch 56 falls from the exit opening and may be collected in a collection vessel 57 for further processing. With this arrangement, high thermal efficiency is provided by encircling the heat source with the batch material being melted, and the transient batch layer 54 being melted is distributed within the vessel by means of its rotation. Thus, the material initially remains exposed to the heat until it becomes liquefied, whereupon it flows out of the liquefaction zone.

Combinations of properties analogous to those in the liquefaction of glass batch may be found in the fusing of ceramic materials and the like and in metallurgical smelting-type operations. As will be appreciated, the invention is not limited to the melting of glass batch materials. Whatever the material to be liquefied, the invention may be advantageously practiced for control of a liquefaction process carried out with a transient layer of batch material supported by a stable layer of granular, preferably non-contaminating material. The preferred stable granular layer provides thermal insulation as well as a non-contaminating contact surface for the transient batch layer, and most preferably the stable layer includes one or more constituents of the batch material. It is desirable for the thermal conductivity of the material employed as the stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a noncontaminating stable layer. For example, in a glassmaking process, pulverizing cullet (scrap glass) could constitute the stable layer, although a thicker layer would be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

Process parameters should be controlled to maintain desired steady state conditions within the melter, e.g., desired batch wall thickness. For this reason, the thickness of the batch wall is monitored during the melting process. It has been found that temperatures along the top of the batch wall provide a good indication of the location of the batch wall boundary within the drum 12, and further, that the boundary of the batch wall at the top of the drum is a good indication of batch wall thickness throughout the drum. To monitor the boundary of the batch wall, a plurality of thermocouples may be inserted through holes 60 in the lid 28 as shown in FIG. 2. A centrally located thermocouple 72 is mounted in opening 73 for measuring melter temperature adjacent to the interior face 74 of the lid 28 primarily for detecting overheating of the lid and to provide a reference temperature.

Another factor in controlling batch wall thickness is distribution of the radiant energy within the melter. More particularly, impingement of the flame issuing from burners, e.g., the burners 34 and 35, should be controlled in a manner that assures substantially uniform liquefaction of the transient layer. Localized concentration of energy could result in a zone of relatively thin batch wall, leading to localized hot spots along the drum 12 and risking overheating a portion of the drum.

In other words, to obtain the insulation advantages of the stable batch layer, the liquefaction process should provide generally uniform depletion of the transient layer over the entire melter interior. A preferred burner arrangement includes the primary burner 34 having a plurality of openings oriented for directing the flame at an oblique angle relative to the burner axis.

The primary burner 34 depicted in the drawings is a six port, water cooled burner for directing a flame from each port at about a 30° angle to the burner axis to produce a generally conical flame profile for providing flame impingement over a wide area of the melting surface. In addition, the burner is mounted slightly off center relative to the axis of symmetry of the drum 12. The assymetric mounting causes the flame from each port of the primary burner to impinge upon the melting surface at varying elevations, thereby distributing the most intense zones of heating over a relatively wide area of the melting surface as the drum rotates. A symmetric placement of such a burner would detrimentally produce a circle of concentrated heating at a fixed elevation of the rotating batch wall. With this type of melter it is advantageous to use a burner adapted to produce an oxygen enriched flame, and thereby utilizing intensified heat flux and relatively small exhaust gas volumes.

A second burner, e.g., the auxiliary burner 35, selectively heats particular areas of the melter interior as needed. The burner 35 is a collimated burner designed to produce a flame having a generally cylindrical profile for heating a relatively small, well defined area of the melter interior.

As shown in FIG. 3, the burner 35 is oriented so that the flames issuing therefrom impinge upon the transient layer adjacent to the bushing 24 primarily for controlled increase of product temperature and, as will be appreciated, for selectively increasing pressure within the melter at the outlet opening 26. If pressure control is desired primarily, the burner 35 may be directed toward the center of the opening.

In operation, the overall pressure within the melter is affected by the gaseous input flow rate (e.g., the fuel and oxygen flow rates of the burners) and by the exhaust draft (i.e., the pressure in gas escape paths upstream and downstream of the melter). Additionally, vertical pressure gradients are present within the heated cavity due to the tendency of heated gases to rise, whereby pressure at the upper end of the melter may be greater than the pressure at the bottom, and both may be different from the ambient pressure outside the melter. Other pressure gradients, sometimes including lateral gradients, can be produced by burner location and orientation, the configuration of the batch lining as it relates to impingement of combustion gases thereon, and the exhaust location.

In the following discussion, negative and positive pressure refers to gage pressure within the melter relative to ambient pressure outside the melter.

Although pressure close to the inner face of the lid 28, e.g., as measured through a tap 80 (shown in FIG. 3), can be controlled to be, for example, slightly above ambient pressure by adjusting the exhaust draft, e.g., by means of a fan or damper within the exhaust duct 38, there can still be either positive or negative pressures at the outlet opening 26.

Negative pressure is undesirable because it creates a tendency for ambient air to enter the melter, thereby decreasing thermal efficiency. In addition, ingress of ambient atmosphere dilutes the exhaust gas stream and could lead to increased formation of undesirable exhaust gas products such as oxides of nitrogen, or $NO_x$. Positive pressure is also undesirable becauuse thermal energy, exhaust gases, and loose batch dust may escape through unsealed or partially sealed openings in the melter 10, causing undesirable contamination of either the ambient atmosphere outside the melter or within a subsequent processing chamber, or erosion of refractory joints or seals in and about the melter 10. It is therefore desirable to control the pressure within the melter.

To this end, when the outlet pressure is negative and the pressure at the interior face of the lid 28 assumed to be held constant, the auxiliary burner 35 can be adjusted so that the velocity pressure of the flame issuing therefrom is sufficient to overcome a negative outlet pressure while orienting the burner to direct flames to the vicinity of the opening 26. "Velocity pressure" is defined as the difference between the total pressure and the static pressure on an obstacle in a flow stream. At times when the auxiliary burner 35 may not be needed for pressure control of the outlet, the burner 35 may be adjusted to keep its velocity pressure low and directed so that flames impinge upon the transient layer close to the opening 26 for the sake of temperature control of the molten product.

A significant operating parameter affecting the existence of either positive or negative pressure at the outlet 26 is the firing rate (and thus the melter throughput). It has been found that, as throughput is increased, the outlet pressure tends to become more positive, and as throughput is decreased, it tends toward negative pressure. Therefore, overall process control involves adjustments to the burners 34 and 35 when throughput changes are made.

A number of other factors, in addition to throughput, affect melter pressures, including pressure upstream of the melter (e.g., within the exhaust ducts 38 and the feed chute 40) and downstream of the melter (beyond the bushing 24). As noted above, within the melter, the velocity pressure of the combustible material from the burners 34 and 35 influences the pressure within the melter. In addition, the solid and liquid batch materials lining the melter sidewalls form an irregular, constantly changing surface on which flames issuing from the burners 34 and 35 impinge. The varying distances between burner nozzles and the irregular melting surface create localized pressure gradients. These factors combine to create both temperature and pressure gradients within the melter which vary both parallel and transverse to the axis of rotation of the drum 12.

The type, number, and location of the burners can vary from the examples specifically described. In particular, there may be more than two burners. For example, the primary combustion means could comprise a plurality of burners directed onto different portions of the melting surface.

In addition to pressure control within the melting vessel 10 itself, pressure control at the outlet opening can advantageously be transmitted to a downstream vessel, such as collection vessel 57. Thus, avoiding a negative pressure at outlet 26 can, by means of the present invention, also prevent a negative pressure within vessel 57, thereby avoiding inspiration of air into the vessel 57.

The above embodiments of the invention were presented to illustrate features of the invention and are not limiting thereto, the scope of the invention being defined by the claims which follow.

I claim:

1. A method of liquefying pulverulent material comprising: feeding pulverulent material onto a melting surface facing a central cavity within a vessel, directing thermal energy toward a major portion of the melting surface from primary combustion means so as to liquefy the material, draining liquefied material from the melting surface through a drain opening at a bottom portion of the cavity, and directing a combustion gas stream from secondary combustion means to a selected minor portion of the vessel interior in the region of the drain opening and below the region toward which the primary combustion means is directed so as to increase pressure in that portion.

2. The method of claim 1 wherein pulverulent material is maintained encircling the central cavity in the vessel so as to support the melting surface facing the central cavity.

3. The method of claim 2 wherein the encircling pulverulent material is maintained on side wall portions of the vessel, and the side wall portions are rotated about the central cavity.

4. The method of claim 3 wherein the side wall portions are rotated about a substantially vertical axis, a stationary lid member is supported at an upper end of the vessel, and additional pulverulent material is fed into the vessel through an opening in the lid member.

5. The method of claim 1 wherein a plurality of combustion streams are directed toward the melting surface by the primary combustion means, and a single combustion stream is projected from the secondary combustion means.

6. The method of claim 5 wherein the primary and secondary combustion streams are substantially nitrogen-free.

7. The method of claim 1 wherein a plurality of combustion streams are directed toward the melting surface by the primary combustion means.

8. The method of claim 7 wherein the plurality of combustion streams are directed toward a plurality of elevations on the melting surface.

9. The method of claim 8 wherein the pulverulent material is glass batch.

10. The method of claim 1 wherein the pulverulent material is glass batch.

11. The method of claim 1 wherein velocity pressure of the secondary combustion means is controlled to provide total pressure within the vessel at the drain opening substantially equal to ambient pressure outside the vessel.

12. A method of liquefying pulverulent material comprising: feeding pulverulent material into an upper end of a vessel onto a melting surface facing a central cavity within the vessel, draining liquefied material through a drain opening at a lower end of the vessel, directing thermal energy toward a major portion of the melting surface from primary combustion means so as to liquefy the material, directing a combustion gas stream from secondary combustion means to a selected minor portion of the vessel interior in the region of the drain opening and below the region toward which the primary combustion means is directed so as to control the temperature of the liquefied material being drained.

13. The method of claim 12 wherein pulverulent material is maintained encircling the central cavity in the vessel so as to support the melting surface facing the central cavity.

14. The method of claim 13 wherein the encircling pulverulent material is maintained on side wall portions of the vessel, and the side wall portions are rotated about the central cavity.

15. The method of claim 14 wherein the side wall portions are rotated about a substantially vertical axis, a stationary lid member is supported at an upper end of the vessel, and additional pulverulent material is fed into the vessel through an opening in the lid member.

16. The method of claim 12 wherein a plurality of combustion streams are directed toward the melting surface by the primary combustion means, and a single combustion stream is projected from the secondary combustion means.

17. The method of claim 16 wherein the primary and secondary combustion streams are substantially nitrogen-free.

18. The method of claim 12 wherein a plurality of combustion streams are directed toward the melting surface by the primary combustion means.

19. The method of claim 18 wherein the plurality of combustion streams are directed toward a plurality of elevations on the melting surface.

20. The method of claim 19 wherein the pulverulent material is glass batch.

21. The method of claim 12 wherein the pulverulent material is glass batch.

22. Apparatus for liquefying pulverulent material comprising: a vessel having an inclined melting surface facing a central cavity, means for feeding pulverulent material onto the melting surface, means for draining liquefied material from a lower portion of the melting surface, primary combustion heating means for directing combustion gases onto a relatively wide area of the melting surface, and secondary combustion heating means for directing combustion gases into the cavity in a relatively narrow region in the vicinity of the draining means and below the region toward which primary combustion means is directed.

23. The apparatus of claim 22 wherein the vessel comprises a drum supported for rotation about a substantially vertical axis, and a stationary lid member mounted at the upper end of the drum, the primary and secondary heating means being carried by the lid member.

24. The apparatus of claim 22 wherein the primary combustion heating means includes a plurality of combustion ports.

* * * * *